United States Patent [19]

Grimmer et al.

[11] Patent Number: 5,457,973
[45] Date of Patent: Oct. 17, 1995

[54] AXIALLY ACTIVATED SYSTEM FOR A KEY LOCK

[75] Inventors: Larry R. Grimmer, Sussex; William D. Boppre, Thiensville, both of Wis.

[73] Assignee: Strattec Security Corporation, Milwaukee, Wis.

[21] Appl. No.: 392,611

[22] Filed: Feb. 22, 1995

Related U.S. Application Data

[63] Continuation of Ser. No. 143,502, Oct. 26, 1993, abandoned, which is a continuation of Ser. No. 14,628, Feb. 18, 1993, abandoned, which is a continuation of Ser. No. 902,445, Jun. 19, 1992, abandoned, which is a continuation of Ser. No. 687,389, Apr. 18, 1991, abandoned.

[51] Int. Cl.[6] .................................................. B60R 25/02
[52] U.S. Cl. ........................ 70/252; 70/441; 70/DIG. 30
[58] Field of Search ................................ 70/388, 441, 491, 70/365, 366, DIG. 30, 252, 184–186

[56] References Cited

U.S. PATENT DOCUMENTS

| | | | |
|---|---|---|---|
| 1,173,677 | 2/1916 | Müller | 70/421 |
| 1,325,622 | 12/1919 | Coselia | 70/388 |
| 2,063,088 | 12/1936 | Fitzgerald | 70/252 |
| 2,101,446 | 12/1937 | Neiman | 70/441 |
| 2,706,394 | 4/1955 | Wohrle | 70/491 |
| 3,404,548 | 10/1968 | Keefer | 70/366 |
| 3,520,161 | 7/1970 | Jacobi | 70/372 |
| 3,650,131 | 3/1972 | Eichenauer | 70/252 |
| 3,748,877 | 7/1973 | Wolter | 70/252 X |
| 3,826,116 | 7/1974 | Messera et al. | 70/388 |
| 3,859,828 | 1/1975 | Ibuka et al. | 70/252 |
| 3,863,473 | 2/1975 | Neale | 70/186 |
| 3,902,341 | 9/1975 | Peitsmeier | 70/252 |
| 3,959,996 | 6/1976 | Thirion | 70/252 X |
| 4,090,175 | 5/1978 | Hart | 70/491 X |
| 4,114,412 | 9/1978 | Braatz | 70/441 |
| 4,147,905 | 4/1979 | Scherbing | 70/491 X |
| 4,196,605 | 4/1980 | Garza | 70/360 |
| 4,196,606 | 4/1980 | Guiraud | 70/491 |
| 4,414,830 | 11/1983 | Maiocco | 70/252 |
| 4,601,184 | 7/1986 | Doinel | 70/365 X |

FOREIGN PATENT DOCUMENTS

| | | | |
|---|---|---|---|
| 0380979 | 9/1923 | Germany | 70/365 |
| 2711294 | 9/1978 | Germany | 70/365 |
| 442764 | 11/1948 | Italy | 70/365 |
| 1133221 | 11/1968 | United Kingdom | 70/441 |

*Primary Examiner*—Lloyd A. Gall
*Attorney, Agent, or Firm*—Andrus, Sceales, Starke & Sawall

[57] ABSTRACT

A lock and key actuator for actuating a desired controlled component upon insertion of a key into the lock. The actuator includes either a sliding or pivoting member movable between non-actuated and actuated positions. The actuator may include a slidable plunger between the lock and controlled component. The system may be employed as a buzzer actuator on a vehicle ignition lock for signalling that a key is in the lock under certain conditions.

3 Claims, 1 Drawing Sheet

5,457,973

AXIALLY ACTIVATED SYSTEM FOR A KEY LOCK

This application is a continuation of Ser. No. 08/143,502 filed Oct. 26, 1993, now abandoned, which in turn is a continuation of Ser. No. 08/014,628 filed Feb. 18, 1993, now abandoned, which in turn is a continuation of Ser. No. 07/902,445 filed Jun. 19, 1992, now abandoned, which in turn is a continuation of Ser. No. 07/687,389 filed Apr. 18, 1991, now abandoned.

BACKGROUND OF THE INVENTION

1. Field of the Invention

The present invention relates to locks, and more particularly to an axially actuated buzzer system for a vehicle ignition lock.

2. Description of the Prior Art

Various types of key actuated mechanisms are known for use in connection with ignition switch locks for vehicles. One such mechanism is actuated upon the failure of the driver to remove the ignition key from the ignition switch. Such a system energizes a buzzer circuit which is then actuated by the opening of the door on the driver side of the vehicle in the event the ignition key is left in the ignition lock.

An example of an ignition lock key actuated buzzer system is illustrated in the Jacobi U.S. Pat. No. 3,520,161. As there shown, a pivoting lever is mounted in the side wall of the lock sleeve and is pivotable radially outward from the sleeve to energize a buzzer circuit when a straight edge of the ignition key is inserted into the key slot of the cylinder. The Jacobi actuator, although adequate for its intended purpose, is limited in its applicability to modern vehicles due to space limitations in the steering column, requiring a more compact design.

Other actuator systems which rely on radial motion of the actuator upon engagement of a side portion of the key are shown in U.S. Pat. Nos. 3,902,341 issued to Peitsmeier on Sep. 2, 1975; 3,748,877 issued to Wolter on Jul. 31, 1973; and 2,063,088 issued to FitzGerald on Dec. 8, 1936. As with Jacobi, all of the radial actuator systems require use of space outside the periphery of the lock sleeve in order to utilize the actuator system.

An axially actuated lock system is shown and described in U.S. Pat. No. 4,196,605 issued to Garza on Apr. 8, 1980. In the Garza patent, the cylinder is axially movable to engage the actuator upon insertion of a mated key in the key slot. The actuator is dependent upon controlled axial motion of the cylinder. While Garza discloses a design which does not extend the radial periphery of the lock system, as required of earlier designs, it requires a complex assembly to permit both axial and rotational movement of the lock cylinder.

SUMMARY OF THE INVENTION

The present invention provides a key controlled actuator for a vehicle ignition switch with all of the components of the actuator housed entirely within the standard sleeve and cylinder of the lock. The cylinder is functional in the standard rotational mode and the axial motion of the key as it is inserted in the lock is used to engage the actuator.

A side portion of the key, near the outer tip, is used to engage and move the actuator from a non-actuated position to an actuated position and an axial motion within the cylinder housing assembly. By utilizing a side portion of the key, direct force on the tip of the key is avoided, minimizing the push out force against the key, which can tend to push the key out of the key slot in the cylinder during typical use.

In accordance with the present invention, the actuator may include either a pivotable lever located at the tip end of the cylinder and mounted for pivotable motion on an axis which is transverse to the longitudinal axis of the cylinder, or in the alternative, a slidable rod may be used to provide direct axial movement of the actuator from the non-actuated position to the actuated position.

In either embodiment, the actuator is normally biased by a spring or the like toward the non-actuated position. Upon insert of the key in the slot, a portion of the key adjacent the tip end engages the actuator and either axially moves or pivots it from the biased, non-actuated position to the actuated position to energize or actuate a controlled component such as a buzzer circuit. Typically, the buzzer circuit is then activated when the driver side door of the vehicle is opened with the key still in the ignition lock, signalling to the driver that the key has not been properly removed.

It is an object and feature of the present invention that the axial motion actuator can be housed within the sleeve and cylinder of a standard ignition lock system, making the actuator system of the present invention particularly desirable for vehicles of current design, where radial space available for the ignition lock cylinder and sleeve is severely limited.

It is also an object and feature of the present invention to provide an axial motion actuator which does not rely on a direct one-to-one force being applied by the tip of the key as the key is inserted into the key slot of the cylinder.

Other objects and features of the invention will be readily apparent from the following drawing and description of the preferred embodiments.

DESCRIPTION OF THE PREFERRED EMBODIMENTS

Figure 1:
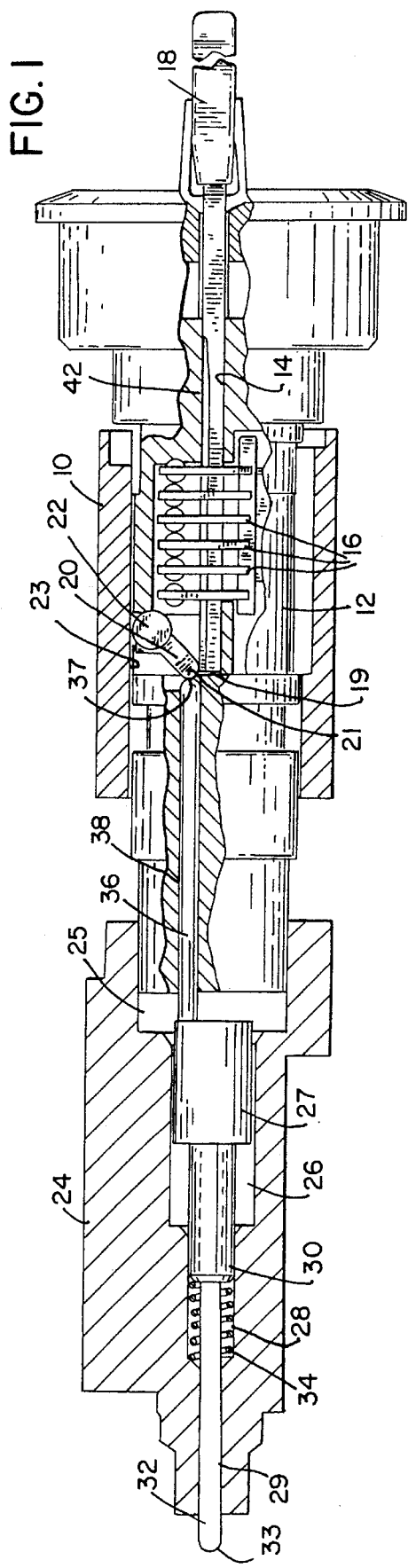
FIG. 1 is a side elevation view, partially in section, showing an ignition key lock and actuator in accordance with the present invention.

An ignition lock and actuator system in accordance with the present invention is shown in FIG. 1. Sleeve 10 is generally a cylindrical sleeve having a longitudinal central bore adapted for receiving a cylinder 12. The cylinder 12 includes a slot 14 for receiving a key 18. In the manner well known to those who are skilled in the art, tumblers 16 in the cylinder are adapted to be engaged by predetermined notches (not shown) on an edge of the blade of the key 18 and, when properly mated, permit rotation of the cylinder 12 in the sleeve 10 to energize the ignition of a vehicle.

Figure 2:
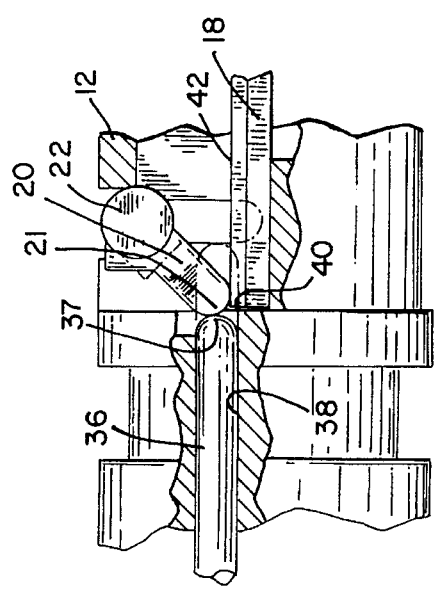
FIG. 2 is an enlarged fragmentary view, in section, similar to FIG. 1 and illustrating a pivotable lock actuator in accordance with the present invention.

In the embodiment of FIGS. 1 and 2, an actuator lever 20 is mounted in a cavity 23 provided in the cylinder. The actuator lever 20 is pivotable about a pivot point 22, defining a pivot axis which is transverse to the longitudinal axis of the cylinder and sleeve. The outer tip 21 of the actuator lever intercepts the key slot 14, as best shown in FIG. 2.

A plunger housing 24 is mounted in axial alignment with the sleeve and cylinder, and is provided with a recessed cavity 25 for receiving the outer end of the cylinder 12 to provide for precise axial alignment. The plunger housing 24 includes a spool cavity 26 which is in communication with the recess 25, and a spring cavity 28 which is in communication with the spool cavity. An energizing plunger channel 29 is located in the housing 24 opposite the cylinder recess 25.

A spool 27 is mounted in the spool cavity 26 and is adapted to move axially relative to the cavity. One end of the spool terminates in a spring shoulder 30 which is slidably received in the spring cavity 28. An energizing plunger leg 32 extends outwardly from the spring shoulder 30 into channel 29 and terminates in an energizing tip 33. A compression spring 34 is located in the spring cavity 28 for engaging the spring shoulder 30 and biasing the spool assembly 27 toward the lock assembly comprising the cylinder 12 and sleeve 10. An actuator plunger 36 extends outwardly from the opposite end of the spool 27 along an axis parallel to the longitudinal axis of the sleeve and cylinder assembly. As best shown in FIG. 2, a channel 38 is provided in the cylinder 12 and extends longitudinally along an axis parallel to the key slot axis, intercepting the actuator cavity 25 at 40. The actuator plunger leg 36 terminates in a tip 37 which is adapted to be engaged by the actuator lever 20.

When the key 18 is inserted in the key slot 14 of the cylinder, the tip 19 of the key engages the tip 21 of the actuator lever and causes it to pivot axially outward and upward as the key is moved longitudinally into the slot. As the key is further inserted, the tip 21 of the actuator lever 20 rides on the side edge 42 of the key blade, forcing the activator tip 21 into engagement with the outer end of tip 37 of the actuator plunger leg 36. This urges the plunger and spool against the spring 34, advancing tip 33 of the actuating plunger leg 32 outward from the plunger housing to engage and energize a corresponding controlled component (not shown).

Figure 3:
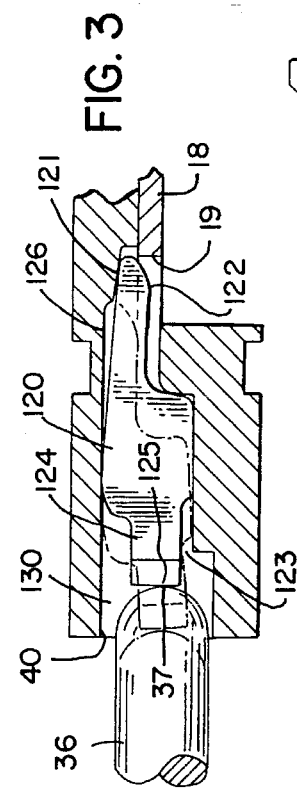
FIG. 3 is a fragmentary view, partially in section, looking in the same direction as FIG. 2 and showing an alternative sliding motion actuator in accordance with the present invention.
Figure 4:
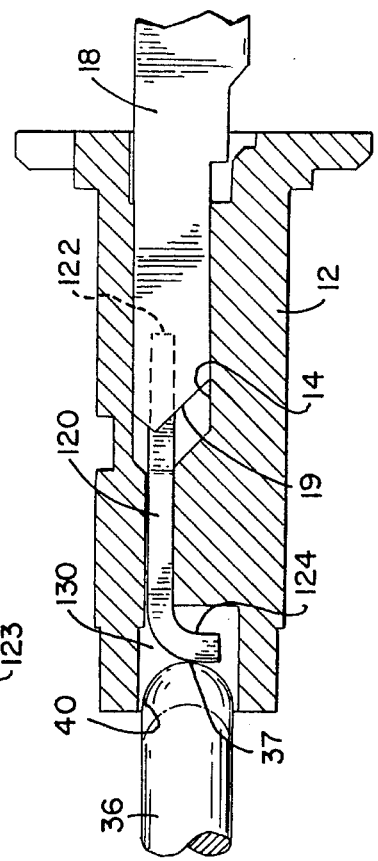
FIG. 4 is a fragmentary view of the embodiment of FIG. 3, rotated 90° to show the slot in the key for engaging the actuator.

An alternative embodiment of the invention is shown in FIGS. 3 and 4. As there shown, an axial sliding actuator 120 is housed in an elongate actuator cavity 123 which intersects the plunger cavity at 40. The actuator 120 includes an upper leg 121 having a rounded tip 122 which intercepts the key slot 14 of the cylinder 12. The opposite end of the actuator 120 terminates in an extension leg 124 having a tip 125 which is in axial alignment with tip 37 of the actuator plunger leg 36. As the key 18 is inserted into the key slot 14, the tip 19 of the key engages the rounded tip 122 of the actuator, causing the actuator to ride axially and radially along the wall 126 of the cavity 123. As the key is further inserted in the slot 14, the leg 121 of the actuator engages the side edge 42 of the key blade, advancing the actuator in the cavity 123 for engaging the actuator plunger leg 36 and advancing it axially to actuate a controlled component, as previously described.

As shown in FIG. 4, the actuator cavity 123 is a longitudinally extending channel which is parallel to and radially spaced from the longitudinal axis of the cylinder 12. Channel 123 terminates in the enlarged cavity 130 which intercepts the channel for the actuator plunger leg 36 at 40. The actuator 120 comprises an L-shaped pin or rod having leg 124 which is adapted to engage the tip 37 of the plunger 36.

As the key 18 is inserted in the slot 14, the actuator 120 is intercepted by the key, and upon continued further insertion of the key the actuator 120 is pushed into engagement with the tip 37 of the actuator plunger 36 for moving the plunger assembly from a non-actuated position to an actuated position, as previously described.

While certain features and embodiments of the invention have been described herein, it will be readily understood that the invention encompasses all enhancements and modifications within the scope of the following claims.

We claim:

1. A cylinder lock comprising a cylinder rotatable about a longitudinal axis, the cylinder including a key slot extending longitudinally along said axis for axially and slidably receiving a key therein, an axially sliding actuator within said cylinder for actuating a component upon insertion of the key in the key slot, said actuator including an axially extending elongate body having a forward leg and rearward leg, said elongate body and legs axially and slidably movable between a first position wherein the forward leg of said actuator extends into interfering relation with the key slot, and a second position wherein the forward leg of said actuator is slid simultaneously in an axial and a radial direction outside of the key slot by said key, said actuator axially sliding in an elongate actuator cavity having a forward end receiving said forward leg and opening into the key slot and a rearward end receiving said rearward leg, said actuator cavity having a stepped wall at the forward end including a tapered wall portion which engages the forward leg of said actuator when said actuator is in said first position to orientate said forward leg in said interfering relation with said key slot, and a leg receiving portion for receiving the forward leg of said actuator when said actuator is in said second position; and biasing means for biasing said actuator to its first position, said biasing means applying a force axially against said key when said actuator is in said first position but radially against said key when said actuator is in said second position to minimize axially directed push out force against the key when in said second position.

2. The lock of claim 1 further including a plunger disposed between the actuator and the component to be controlled.

3. The lock of claim 2 wherein the cylinder includes a longitudinally extending passageway parallel to the longitudinal axis of the cylinder for receiving and guiding said plunger, said passageway including a forward end opening into the rearward end of said actuator cavity.

\* \* \* \* \*